United States Patent [19]

Davenport

[11] Patent Number: 4,974,895
[45] Date of Patent: Dec. 4, 1990

[54] REINFORCED TRUCK BED LINER

[75] Inventor: Bobby E. Davenport, Madison, Tenn.

[73] Assignee: D & G Products, Inc., Mt. Juliet, Tenn.

[21] Appl. No.: 456,500

[22] Filed: Dec. 26, 1989

[51] Int. Cl.$^5$ .............................................. B60R 13/01
[52] U.S. Cl. ................................ 296/39.2; 224/42.42
[58] Field of Search ........................... 296/39.1, 39.2; 105/423; 224/42.42; D12/98

[56] References Cited

U.S. PATENT DOCUMENTS

| Re. 32,198 | 7/1986 | Wayne . | |
|---|---|---|---|
| D. 271,009 | 10/1983 | Fishler | D12/98 |
| D. 298,112 | 10/1988 | Hall | D12/98 |
| 3,653,710 | 4/1972 | Barnard . | |
| 4,047,749 | 9/1977 | Lambitz et al. . | |
| 4,111,481 | 9/1978 | Nix et al. . | |
| 4,128,271 | 12/1978 | Gray . | |
| 4,161,335 | 7/1979 | Nix et al. . | |
| 4,162,098 | 7/1979 | Richardson . | |
| 4,181,349 | 1/1980 | Nix et al. . | |
| 4,245,863 | 1/1981 | Carter . | |
| 4,333,678 | 6/1982 | Munoz et al. . | |
| 4,336,963 | 6/1982 | Nix et al. . | |
| 4,341,412 | 7/1982 | Wayne . | |
| 4,575,146 | 3/1986 | Markos | 296/39.2 |
| 4,707,016 | 11/1987 | McDonald | 296/39.2 |
| 4,750,776 | 6/1988 | Barben | 296/39.2 |

Primary Examiner—Margaret A. Focarino
Assistant Examiner—Gary C. Hoge
Attorney, Agent, or Firm—Harrington A. Lackey

[57] ABSTRACT

A protective truck bed liner incorporating a plurality of spaced rib members in the bottom, opposite sides, and front liner walls of the truck bed liner, as well as their interconnecting juncture portions, in order to substantially reinforce the walls of the liner when installed in a truck bed. The rib members in the bottom wall of the liner are also provided with alternating depressions and lands to minimize slidable movement of a load received on the bottom liner wall, particularly during movement of the truck bed in which the liner is mounted.

31 Claims, 4 Drawing Sheets

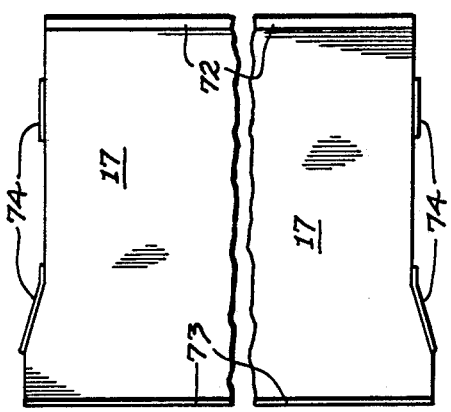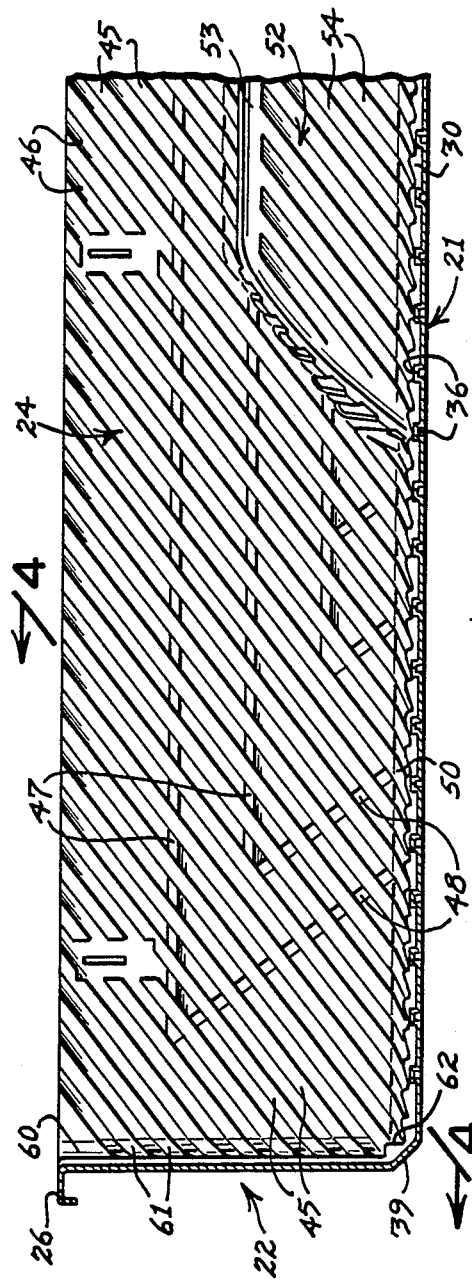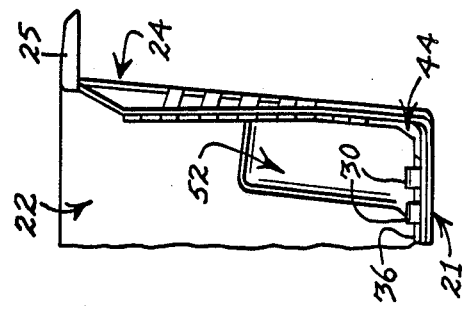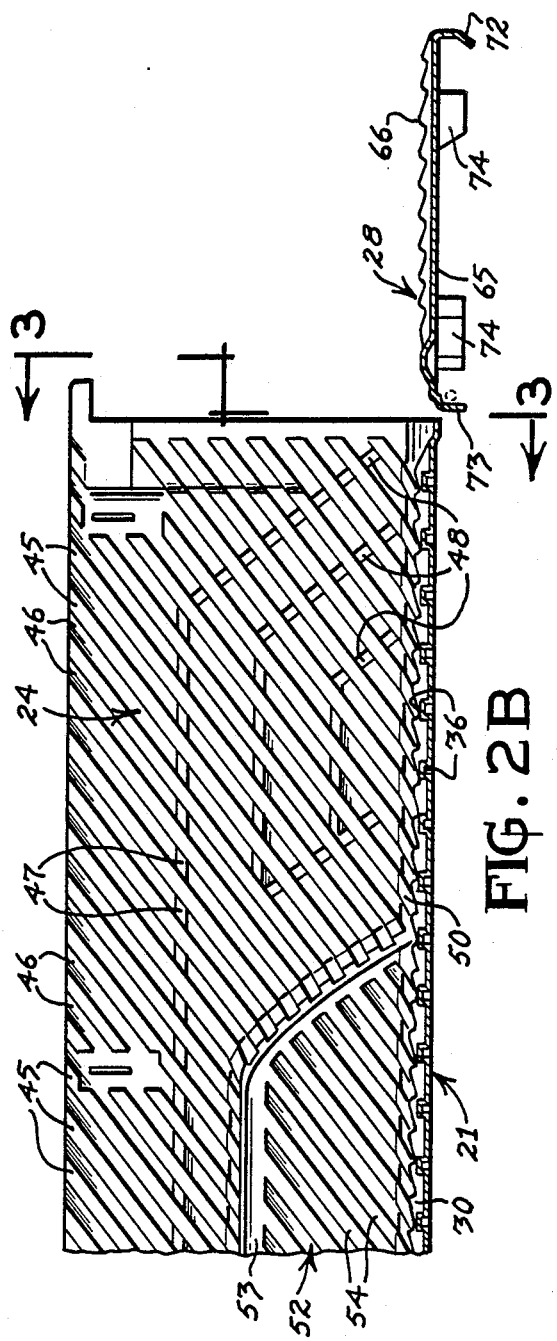

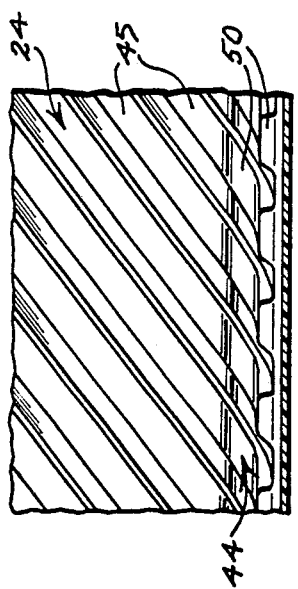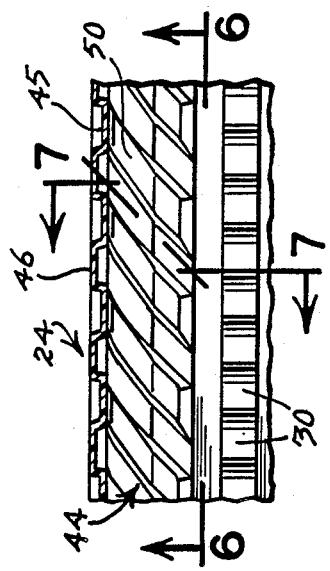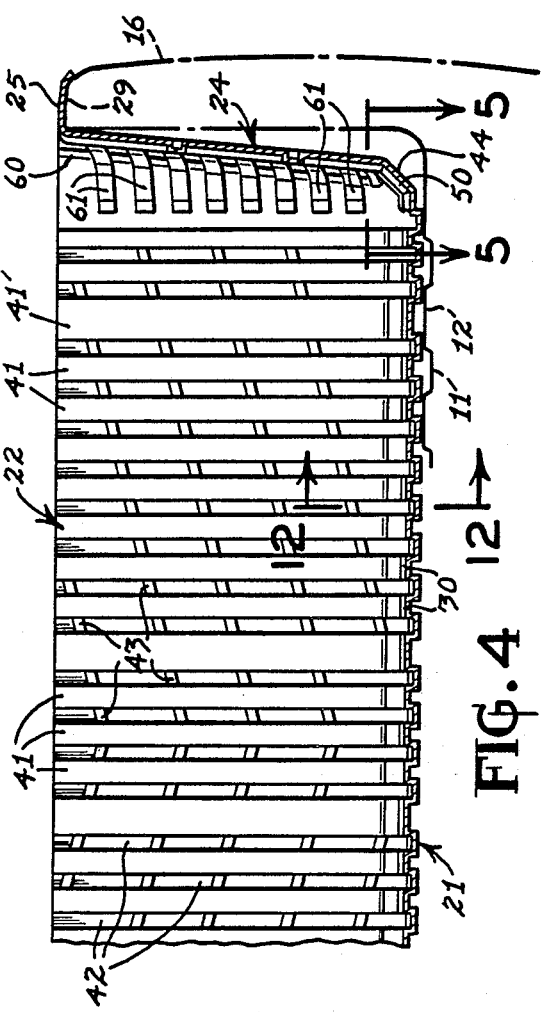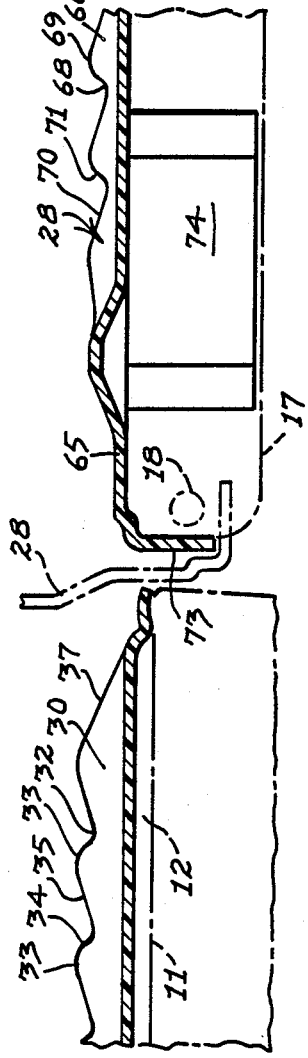

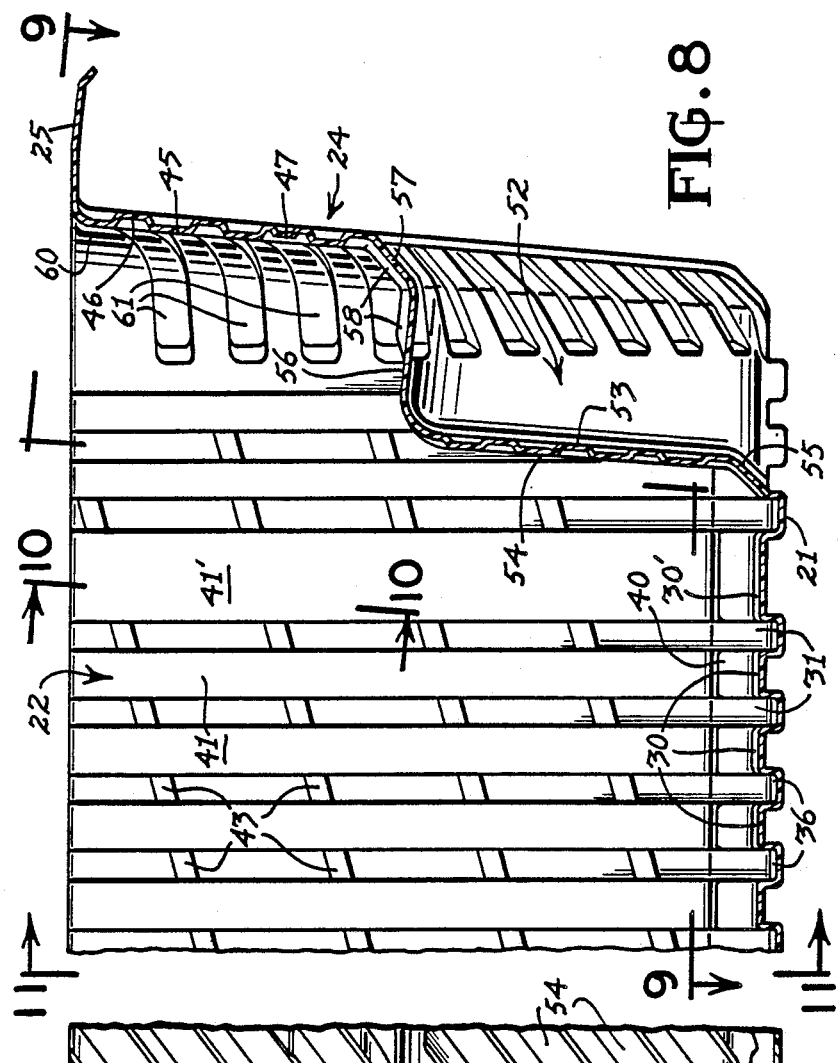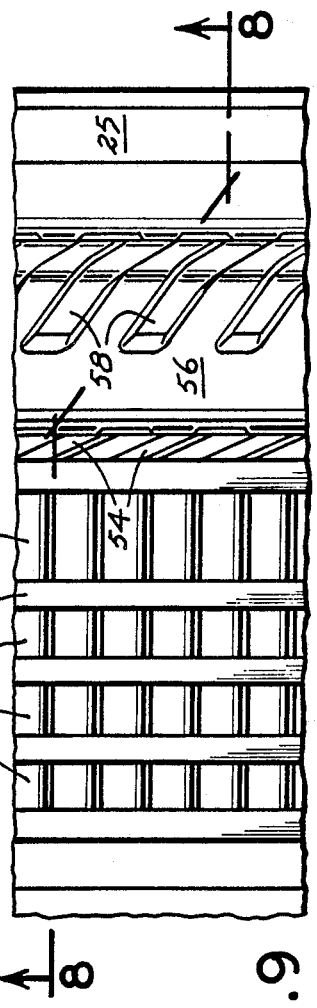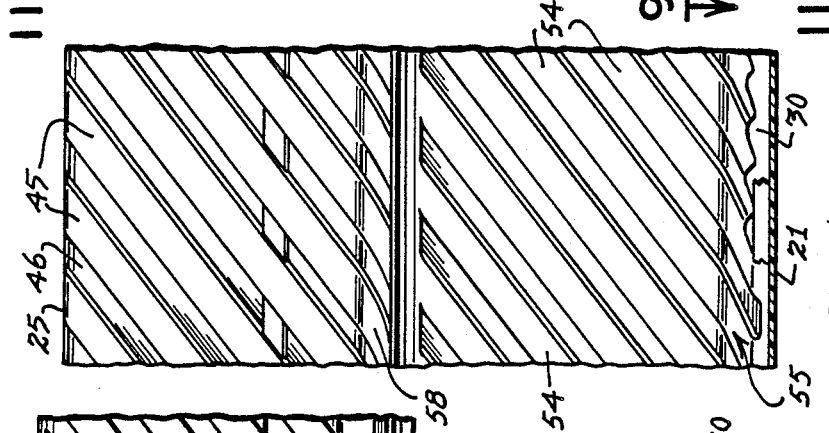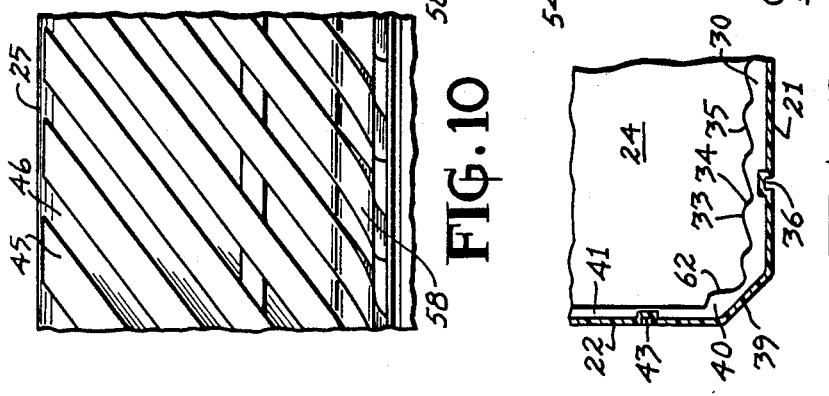

1

REINFORCED TRUCK BED LINER

BACKGROUND OF THE INVENTION

This invention relates to a truck bed liner and more particularly to a reinforced, molded, one-piece truck bed liner.

Molded one-piece truck bed liners, as well as truck bed liners incorporating some rib members in the bottom and front walls, and some reinforcing in the side walls, are known in the art, as shown in the following U.S. Pat Nos.:

| | | |
|---|---|---|
| 3,653,710 | Barnard | Apr. 4, 1972 |
| 4,047,749 | Lambitz et al | Sep. 13, 1977 |
| 4,111,481 | Nix et al | Sep. 5, 1978 |
| 4,128,271 | Gray | Dec. 5, 1978 |
| 4,161,335 | Nix et al | July 17, 1979 |
| 4,162,098 | Richardson | July 24, 1979 |
| 4,181,349 | Nix et al | Jan. 1, 1980 |
| 4,245,863 | Carter | Jan. 20, 1981 |
| 4,333,678 | Munoz et al | June 8, 1982 |
| 4,336,963 | Nix et al | June 29, 1982 |
| 4,341,412 | Wayne | July 27, 1982 |
| Re. 32,198 | Wayne | July 8, 1986 |
| Japan Application 52-53519 | | |

The Barnard patent discloses spaced vertical rib members in the side walls, front wall, and tailgate liner, but not in the bottom wall.

The Lambitz patent discloses longitudinally extending transversely spaced rib members in the bottom liner wall and the tailgate liner wall and vertically extending trapezoidal reinforcing members in the front walls and the side walls of the liner.

All of the Nix et al patents disclose longitudinally extending, transversely spaced rib members in the front and bottom liner walls and the tailgate liner wall, but no reinforcing of any type in the side liner walls.

Gray merely discloses a bottom liner wall having longitudinally extending rib members.

Richardson also discloses a single bottom liner wall having longitudinally extending rib members separated by longitudinal valleys, two of the valleys of which are provided with longitudinally raised portions to permit room for fastening means.

The Carter patent discloses only side liner walls having a few vertically extending reinforcing ribs and a single longitudinally extending rib.

The Munoz et al patent discloses a knock-down truck bed liner in which the front and side walls have recessed areas for reinforcing and the bottom liner wall has divided diagonal rib members. The tailgate liner includes transversely spaced longitudinally extending rib members.

Both of the Wayne patents disclose longitudinally extending, transversely spaced, straight rib members in the front and bottom liner walls and the tailgate liner. The Wayne side walls are provided with reinforcing in the form of simulated shingles.

The Japanese patent merely discloses a bottom liner wall having longitudinally extending, transversely spaced, rib members.

SUMMARY OF THE INVENTION

It is therefore an object of this invention to provide a one-piece truck bed liner in which all of the liner walls, including the tailgate liner are totally reinforced.

A further object of this invention is to provide a one-piece truck bed liner in which all of the liner walls are reinforced with spaced longitudinally extending rib members.

Another object of this invention is to provide a one-piece truck bed liner in which all of the liner walls are reinforced with spaced rib members and there is continuity of the reinforcing rib members between adjacent liner walls.

A further object of this invention is to provide a one-piece truck bed liner in which all of the liner walls are reinforced with spaced rib members, and the juncture portions interconnecting adjacent liner walls are also reinforced with spaced rib members.

Another object of this invention is to provide a truck bed liner incorporating side liner walls reinforced with transversely spaced, longitudinal rib members extending diagonally front-to-rear of each corresponding side liner wall.

A further object of this invention is to provide a truck bed liner incorporating a bottom liner wall having transversely spaced, front-to-rear extending longitudinal rib members having corrugated top surfaces with alternating depressions and lands to minimize slidable movement of a load received on the bottom liner wall, particularly during longitudinal movement of the truck bed in which the liner is mounted.

Another object of this invention is to provide a one-piece truck bed liner in which each of the liner walls is provided with reinforcing longitudinal rib members and intersecting transverse rib members.

Another object of this invention is to provide a truck bed liner including side liner walls having top flanges projecting outboard from the side liner walls and transversely spaced longitudinally extending rib members formed in the corresponding side liner walls and continuing into the intersection of the side liner walls with the top flanges, in order to reinforce the top flanges.

Another object of this invention is to provide a bottom liner wall in a truck bed liner incorporating a plurality of transversely spaced longitudinally extending rib members having alternate depressions formed in the top surface of each rib member, each depression including a front and rear intersecting wall in which the front wall is steeper than the rear wall to permit the sweeping of debris over the bottom wall in a rearward direction.

A further object of this invention is to provide a one-piece truck bed liner including a front liner wall and a bottom liner wall having continuing, longitudinally extending rib members, and a transverse ledge member in the front of the liner adjacent the bottom liner wall to limit movement of cargo resting on the bottom liner wall to prevent engagement of the cargo with the front liner wall.

BRIEF DESCRIPTION OF THE DRAWINGS

FIG. 2A is a vertical fragmentary section, taken along the line 2—2 of FIG. 1, showing the front portion of the right side liner wall of the liner disclosed in FIG. 1;

FIG. 2B is an enlarged fragmentary section, taken along the line 2—2 of FIG. 1, showing the rear portion of the right side liner wall;

FIG. 3 is a fragmentary rear end elevational view taken along the line 3—3 of FIG. 2B;

FIG. 4 is a fragmentary sectional elevation taken along the line 4—4 of FIG. 2A;

FIG. 5 is an enlarged fragmentary section taken along the line 5—5 of FIG. 4;

FIG. 6 is a fragmentary section taken along the line 6—6 of FIG. 5;

FIG. 7 is a fragmentary section taken along the line 7—7 of FIG. 5;

FIG. 8 is a fragmentary elevational sectional view taken along the line 8—8 of FIG. 9 through the wheel well portion of the liner, looking forward;

FIG. 9 is a fragmentary plan sectional view taken along the line 9—9 of FIG. 8;

FIG. 10 is a fragmentary view taken along the line 10—10 of FIG. 8;

FIG. 11 i a fragmentary sectional view taken along the line 11—11 of FIG. 8;

FIG. 12 is an enlarged fragmentary section taken along the line 12—12 of FIG. 4;

FIG. 13 is an enlarged fragmentary sectional elevation of the rear portion of the bottom liner wall and the front portion of the tailgate liner wall, in an open position in lines and in closed position in phantom, and taken along the line 13—13 of FIG. 1; and FIG. 14 is an exterior view of the tailgate liner disclosed in FIG. 2B, with portions broken away and a tailgate shown in phantom.

DESCRIPTION OF THE PREFERRED EMBODIMENTS

Figure 1:
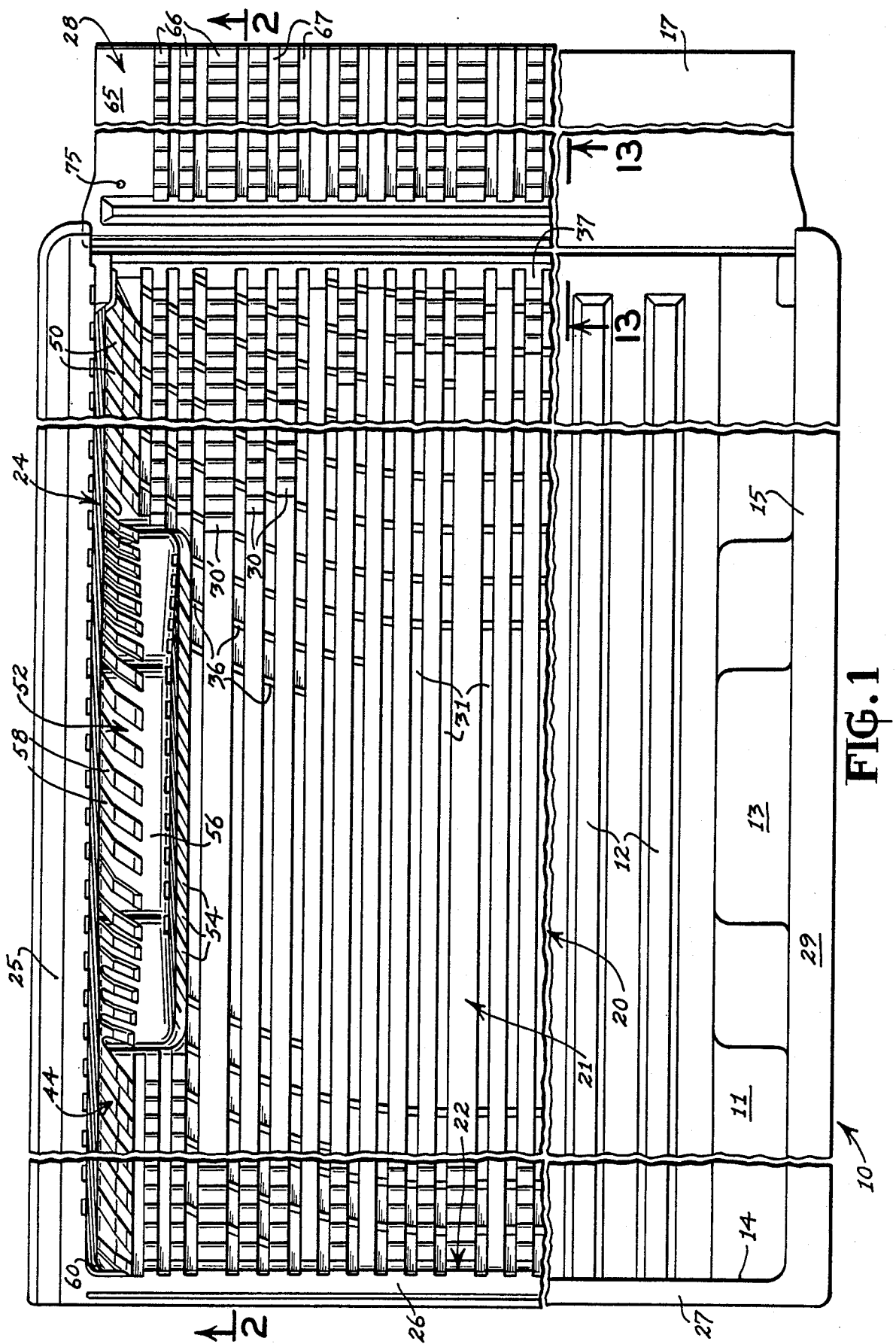
FIG. 1 is a top plan view of a truck bed liner, and a tailgate liner, shown fragmentarily, mounted in a truck bed, and an open tailgate, respectively, with portions broken away.

FIG. 1 discloses a conventional pickup truck bed 10 including a bottom wall 11 having elongated ribs 12 extending front-to-rear and fender wells 13. The truck bed 10 also includes a front wall 14, a left side wall 15 and a right side wall 16 (FIG. 4). The rear end of the liner 10 is open, but adapted to be enclosed by an elongated substantially rectangular tailgate 17 connected to the rear end of the truck bed by hinge member 18.

Adapted to be mounted within the truck bed 10 is a truck bed liner 20, made in accordance with this invention. The truck bed liner 20 is preferably a one-piece molded body made of a thermo-setting plastic material, such as polyethylene.

The truck bed liner 20 made in accordance with this invention includes a bottom liner wall 21, a front liner wall 22, and opposite side liner walls, such as the right side liner wall 24. Although the left side liner wall is not shown, it is identical in structure to, and the mirror-image of, the right side liner wall 24. Each of the liner walls 21, 22 and 24 is adapted to span substantially the entire area of, and to cover, its corresponding truck bed wall 11, 14, 15, and 16. Each of the side liner walls 24 terminates its upper end portion in an outboard projecting top flange 25, which is adapted to fit snugly over the top surface 29 of the corresponding truck bed walls 15 and 16, respectively. In like manner, the front liner wall 22 is provided with a forward projecting top flange 26 adapted to fit over the front ledge 27 of the front bed wall 14.

In a preferred form of the invention, the tailgate 17 is covered by a substantially rectangular tailgate liner 28.

Formed in the bottom liner wall 21 are a plurality of longitudinal bottom rib members 30 extending front-to-rear. The bottom rib members 30 are transversely spaced from each other by longitudinally extending valleys 31. The bottom rib members 30 may be of the same or different widths, as illustrated by the bottom rib members 30 and 30' of different widths (FIGS. 1, 8, and 9). As illustrated in FIG. 8, each of the bottom rib members 30 and 30' is substantially channel-shaped opening downward. Moreover, each of the bottom rib members 30 and 30' is preferably of lesser width than the ribs 12 in the bottom bed wall 11, so that the rib members all rest upon the top surfaces of the ribs 12 in the bottom of the truck bed. Thus, the rib members 30 and 30' provide numerous longitudinal ventilation areas of relatively large cross-section in order to minimize condensation and corrosion in the bottom wall 11.

In a preferred form of the invention, most, or all, of the bottom rib members 30 and 30' are provided with a plurality of longitudinally spaced alternating depressions 32 and lands 33, so that the top surfaces of said most, or all, of said bottom rib members 30 and 30' are substantially longitudinally corrugated to provide a surface which is relatively non-slipping. Although loads and cargos may be manually slid over the tops of the lands 33, nevertheless, once the cargo is in position, the alternating lands 33 and depressions 32 in each of these bottom rib members 30 and 30' minimize inadvertent sliding of the cargo when the truck and truck bed 10 are in longitudinal motion. Since neither the bottoms of most cargo, and to some extent the lands 33, are not truly horizontal, the lands 33 function as teeth or abutments for resisting longitudinal movement of the cargo. Moreover, many loads are soft, such as loads wrapped in fabric or plastic, and therefore will sink into the depressions 32 for better gripping and retention.

Also in a preferred form of the invention, each of the depressions 32 in a bottom rib member 30, 30' is defined by a converging and intersecting forward or front wall 34 and a rear wall 35, such as illustrated in FIGS. 12 and 13. As disclosed in FIGS. 12 and 13, the front wall 34 of each depression 32 is substantially steeper than the rear wall 35. Thus, with the abrupt steeper front wall 34 extending upwardly and forwardly and the rear wall sloping more gently rearwardly, the sweeping of debris over the bottom liner wall 21 of the truck bed liner 20 in a rearward direction is facilitated, particularly for any debris caught within the depressions 32.

Also formed in the bottom liner wall 21 are a plurality of longitudinally spaced, transverse bottom rib members 36, which extend transversely in the valleys 31 between the bottom rib members 30 and 30' to intersect the longitudinal bottom rib members 30, 30'. As disclosed in FIG. 1, the transverse bottom rib members 36 are disposed in generally arcuate alignment for aesthetic purposes only. These transverse rib members 36 could extend in straight lines across the bottom liner wall 21.

However, it is preferred that the height of each of the transverse bottom rib members 36 is not as great as the height of the lands 33 in the adjacent longitudinal bottom rib members 30 and 30', so that the transverse bottom rib members 36 will not interfere with the longitudinal movement of cargo.

As disclosed, particularly in FIGS. 2B and 13, the rear end portions 37 of each of the rib members 30, 30' slope gradually toward the rear edge portion of the bottom liner wall 21 to terminate at substantially the same level as the rear end portions of the valleys 31 in order to close the rear end of the bottom bed wall 11 to prevent debris and weather elements from penetrating beneath the bottom liner wall 21. Moreover, the sloping rear end portion 37 of the rib member 30 facilitates longitudinal sliding movement of cargo moving in a forward direction and also facilitate sweeping of debris from the rear of the bottom liner wall 21.

Preferably, the front end portions of the rib members 30 and 30' continue over the transverse intersecting or juncture portion 39 (FIG. 12) interconnecting the bottom liner wall 21 and the front liner wall 22. This continuing rib section 40, which is of substantially the same construction and width as its corresponding bottom rib member 30 or 30', continues upwardly as front rib member 41 formed in the front liner wall 22, as illustrated in FIGS. 8 and 12. However, the front rib members 41 are preferably of uniform cross-section and smooth since the depressions 32 and lands 33 are not required in the front liner wall 22.

Vertically spaced within each of the valleys 42 between the front rib members 41 are a plurality of transverse front rib members 43 which extend between and intersect adjacent front vertical rib members 41. Again, as disclosed in FIGS. 4 and 8, the front transverse rib members 43 may be disposed in arcuate lines for decorative purposes, or they may be disposed in transverse straight lines, if desired. The rearward projection of each front transverse rib member 43 is less than the rear projection of the corresponding front vertical rib members 41 and 41', if desired.

Connected to each of the opposite side edge portions of the bottom liner wall 21 by opposed front-to-rear extending longitudinal intersecting or juncture portions 44 are the corresponding side liner walls 24.

Formed in each of the side liner walls 24 are a plurality of transversely spaced elongated diagonally extending longitudinal side rib members 45. As disclosed in FIGS. 2A and 2B, the diagonal side rib members 45 extend forwardly and downwardly, are straight, and are uniformly spaced apart to form the valleys 46, and are substantially parallel. The diagonal side rib members extend simultaneously both longitudinally and vertically of their corresponding side liner walls 24 in order to improve the rigidity of the side liner walls.

Extending between the diagonal longitudinal side rib members 45 are a plurality of transverse side rib members 47 and 48. The transverse side rib members 47 extend longitudinally front-to-rear in the valleys 46 between and intersecting adjacent longitudinal side rib members 45 at obtuse angles to the diagonal side rib members 45. The transverse side rib members 48 also extend in diagonal lines at substantially right angles to the longitudinal side rib members 45. The transverse side rib members provide further rigidity to the corresponding side liner walls 24.

Again, the transverse side rib members 47 and 48 may have a height or projection from the plane of the respective side liner walls less than the projected height of the longitudinal side rib members 45.

As illustrated in FIGS. 1, 2A, 2B, 4, 8, 10, and 11, the longitudinal side rib members 45 extend upward the entire height of the corresponding side liner walls 24 and intersect the juncture or bend between the top flange 25 and its corresponding side liner wall 24. In this matter, the alternating top ends of the longitudinal side rib members 45 and valleys 46 create an undulating or corrugated effect in the juncture between the top flange 25 and the side liner wall 24 in order to stiffen the juncture and limit the flexibility of the top flange 25.

The lower ends of the diagonal longitudinal side rib members 45 continue to form corresponding rib sections 50 in the bottom intersecting or juncture portions 44. The rib sections 50 may be of substantially the same size, shape, direction and spacing as the longitudinal side rib members 45, as illustrated in FIGS. 2A, 2B, 5, 6, 7, and 11.

Projecting inward from the general plane of each of the side liner walls 24 is a wheel well liner 52 of substantially the same shape and size to receive each wheel well 13 when the liner 20 is seated in its operative position within the truck bed 10. The inner wall 53 of the well liner is also formed to include diagonal rib members 54, which may extend substantially parallel to each other generally in the same direction as the diagonal longitudinal side rib members 45. The bottom edge portion of the inner side wall 53 of the well liner 52 merges in an inward and downward sloping intersecting or juncture portion 55, as illustrated in FIG. 8.

The top wall 56 of the well liner 52 has a sloping outer intersecting or juncture portion 57 in which is formed a plurality of spaced rib sections 58 which are also continuations of the diagonal longitudinal side rib members 45 in their corresponding side liner walls 24. The top well liner wall 56 continues in an arcuate shape to form both the top and ends of the well liner 52, and all portions of the top wall 56 merge into the corresponding portions of the side liner wall 24 by means of the sloping reinforced intersecting portion 57.

Both end portions of the front liner wall 22 merge into or interconnect with the front edge portions of the corresponding adjacent side liner walls 24 in corresponding vertical interconnecting corner portions 60. Each of the interconnecting corner portions 60 includes a plurality of vertically spaced reinforcing rib members or sections 61. As best disclosed in FIGS. 2A and 8, the corner rib sections 61 are extensions of the forwardly projecting diagonal longitudinal side rib members 45. However, as illustrated in FIG. 8, the corner rib sections 61 do not necessarily continue in the same direction as the diagonal rib members 45. For example, in FIGS. 2A and 2B, the diagonal rib members 45 are substantially at 45 deg. to the horizontal, or to the longitudinal axis of the corresponding side liner wall 24, while in FIG. 8, the rib sections 61 tend to form a smaller angle with the horizontal.

In FIG. 12, the front intersecting rib sections 40 form a substantially vertical abutment surface 62, which is spaced behind the front vertical rib members 41. The abutment surface 62 limits or arrests the forward movement of cargo engaging the abutment surface 62 to prevent the cargo from impacting the front liner wall 22, or at least slow down the forward movement of the cargo before it impacts the front liner wall 22, if the cargo has an irregular front surface.

As illustrated in FIGS. 1, 2B, 13 and 14, the tailgate liner 28 is substantially rectangular and has an area great enough to completely cover the interior surface of the tailgate 17. The liner 28 has a substantially planar inside all 65 upon which are formed a plurality of transversely spaced elongated tailgate rib members 66. These rib members 66 extend front-to-rear when the tailgate 17 is in its lowered horizontal position, and vertically when the tailgate is closed. As best disclosed in FIG. 13, each of the rib members 66 is of substantially the same shape and construction as the corresponding bottom rib members 30 and are spaced apart by the longitudinally extending valleys 67. Each of the tailgate rib members 66 includes longitudinally alternating depressions 68, which alternate with raised portions or lands 69. Each depression 68 includes a converging and intersecting front wall 70 and a rear wall 71. However, in the tailgate rib member 66, the front walls 70 are more shallow than the steeper rear walls 71, to provide a better gripping or retarding effect upon loads resting on the tailgate liner 28 in order to minimize rearward sliding movement of the load on the tailgate liner 28, and to prevent the load from falling off the rear end of an open tailgate 17.

The rear or top end edge portion of the tailgate liner 28 forms a hook member 72, as best disclosed in FIG. 2B to fit over the rear or top end edge portion of the corresponding tailgate 17. The front or bottom end portion of the tailgate liner 28 is provided with a depending flange 73 for fitting over the rear or bottom edge portion of the tailgate 17.

Each end of the tailgate 28 is provided with depending end flanges 74 which fit over the corresponding opposite ends of the tailgate 17. The function of the hook member 72, the bottom flange 73, and the depending end flanges 74 are to accurately locate the position of the tailgate liner 28 upon the tailgate 17. In order to hold the tailgate liner 28 upon the tailgate 17, sheet metal screws or other fasteners 75 (FIG. 1) may be utilized.

It will thus be seen that a truck bed liner 20 has been designed in which not only all of the walls, the bottom liner wall 21, the front liner wall 22, and the side liner walls 24, are reinforced throughout their length and width by not only longitudinal rib members, but also transversely extending rib members. Moreover, each of the intersecting or juncture portions interconnecting the edge portions of the corresponding liner walls are also thoroughly reinforced by spaced rib members, most of which are continuations of the rib members on the liner walls connected by the interconnecting portions.

In addition, the bottom rib members 30 are corrugated or provided with longitudinally alternating depressions in order to limit the slidable movement of loads or cargo seated upon the bottom liner wall 21.

The tailgate liner 28 is also provided with similar type rib members 66, resembling the bottom rib members 30 to provide not only reinforcing for the tailgate liner 28, but also to provide a corrugated or roughened surface to limit slidable movement of cargo over the tailgate liner.

Thus, because of the extended reinforcing both longitudinally and transversely in all of the walls in the liner, their interconnecting portions, and the tailgate liner, the truck bed liner 20 made in accordance with this invention is capable of being made of thinner-gauged materials than conventional truck bed liners now available on the market. Thus, thinner, less expensive materials, such as polyethylene, may be used economically in the production of the truck bed liners 20 with the reinforcing ribs to provide the same rigidity as conventional truck bed liners made of thicker or more expensive materials.

The truck bed liner 20 made in accordance with this invention includes reinforced liner walls which are substantially rigid and stable under impact and will tend not to bend or warp out of shape from use and exposure to weather.

Although the top flanges 25 and 26 of the truck bed liner 20 are made substantially flat, nevertheless, the intersection of the juncture edges of the flanges 25 and 26 with their corresponding side wall liners through the intersecting alternating rib members provides sufficient rigidity to maintain the stability and relative inflexibility of the flanges 25 and 26.

What is claimed is:

1. A protective liner for a truck bed, said truck bed having a bottom wall, a front wall, and opposed side walls, each of said walls having an interior surface, comprising:
    (a) a bottom liner wall having front and rear end portions and side edge portions, and adapted to rest upon and to cover the bottom wall of the truck bed,
    (b) opposed side liner walls adapted to cover the opposed side walls of the truck bed and having front and rear end portions and top and bottom portions, and having major surfaces,
    (c) opposed longitudinal bottom juncture portions integrally connecting said opposite side edge portions to the bottom portion of an adjacent side liner wall,
    (d) a plurality of longitudinally spaced rib members in each of said bottom juncture portions, and
    (e) a plurality of transversely spaced longitudinal side rib members extending over said major surfaces of each of said corresponding side liner walls.

2. The invention according to claim 1 in which each of said rib members in said bottom juncture portions is continuous with a longitudinal rib member in an adjacent side liner wall.

3. The invention according to claim 2 in which said longitudinal rib members in said side liner walls are substantially parallel and extend diagonally of the front-to-rear axis of said corresponding side liner wall.

4. The invention according to claim 3 in which the truck bed in which said protective liner is adapted to be mounted has an open rear end and a substantially rectangular tailgate adapted to open and close said open rear end, and further comprising an elongated tailgate liner adapted to cover the interior surface of the tailgate, said tailgate liner having an interior surface and a plurality of transversely spaced tailgate rib members formed in said interior surface, said tailgate rib members extending front-to-rear when said tailgate is open, and further comprising a plurality of said tailgate rib members to minimize the sliding of loads over said tailgate liner.

5. The invention according to claim 4 in which each of said depressions comprises converging intersecting front and rear walls, said rear wall being substantially steeper than said front to wall to prevent slidable rearward movement of a load over the interior surface of said tailgate liner.

6. The invention according to claim 1 further comprising a plurality of spaced transverse rib members in each of said side liner walls intersecting said longitudinal rib members in said side liner walls.

7. The invention according to claim 1 further comprising a front liner wall having opposite end portions and top and bottom portions and adapted to cover the front wall of the truck bed, a transverse juncture portion integrally interconnecting the front end portion of said bottom liner wall and the bottom portion of said front liner wall, a pair of opposed vertical interconnecting corner portions, each corner portion interconnecting an end portion of said front liner wall and a front portion of an adjacent side liner wall, and a plurality of vertically spaced rib members in each of said corner portions.

8. The invention according to claim 7 in which each of said rib members in each of said corner portions is continuous with a longitudinal side rib member in an adjacent side liner wall.

9. The invention according to claim 8 in which said longitudinal side rib members are substantially parallel and extend diagonally of the front-to-rear dimension of said corresponding side liner wall.

10. A protective liner for a truck bed, said truck bed having a side wall comprising:
   (a) a side liner wall adapted to cover the side wall of the truck bed and having front and rear end portions and top and bottom portions,
   (b) a plurality of spaced reinforcing longitudinal side rib members in said side liner wall,
   (c) said longitudinal rib members extending substantially parallel and diagonally of the front-to-rear dimension of said corresponding side liner wall, and
   (d) spaced transverse side rib members extending between and intersecting said longitudinal side rib members.

11. The invention according to claim 10 in which some of said transverse side rib members extend longitudinally front-to-rear of said side liner wall.

12. The invention according to claim 10 in which some of said transverse side rib members extend substantially perpendicularly to said longitudinal side rib members.

13. The invention according to claim 10 further comprising a top flange joining and projecting laterally outboard from said top portion of said side liner wall, and said longitudinal side rib members extend continuously upward into the juncture of said top flange and the top portion of said corresponding side wall.

14. The protective liner for a truck bed, said truck bed having a bottom wall, a front wall, and opposed side walls, each of said walls having an interior surface, comprising:
   (a) a bottom liner wall having front and rear end portions and side edge portions, and adapted to rest upon and to cover the bottom wall of the truck bed,
   (b) said bottom liner wall comprising transversely spaced, front-to-rear extending, raised longitudinal bottom rib members opening downward and having elongated top surfaces, and
   (c) a plurality of longitudinally spaced depressions in said top surfaces of most of said bottom rib members to provide longitudinal alternating lands and depressions said bottom rib members to minimize sliding of loads on said bottom liner wall.

15. The invention according to claim 14 in which each of said depressions comprises converging intersecting front and rear walls, said front wall being substantially steeper than said rear wall to facilitate the sweeping of debris over said bottom liner wall in a rearward direction.

16. The invention according to claim 14 in which said bottom liner wall further comprises a plurality of longitudinally spaced transverse bottom rib members between and intersecting said longitudinal bottom rib members.

17. The invention according to claim 16 in which the height of each of said transverse bottom rib members is less than the height of said lands.

18. The invention according to claim 14 further comprising side liner walls adapted to cover the opposed side walls of the truck bed and having front and rear end portions and top and bottom portions, opposed longitudinal bottom juncture portions integrally connecting said opposite side edge portions to the bottom portion of a corresponding side liner wall, respectively, and a plurality of spaced reinforcing longitudinal side rib members in said side liner walls.

19. The invention according to claim 18 in which said longitudinal side rib members extend diagonally substantially parallel to each other.

20. The invention according to claim 19 further comprising spaced transverse side rib members extending between and intersecting said longitudinal side rib members.

21. The invention according to claim 20 in which some of said transverse side rib members extend perpendicularly to said longitudinal side rib members.

22. The invention according to claim 20 in which some of said transverse side rib members extend longitudinally front-to-rear in each of said corresponding side liner walls.

23. The invention according to claim 19 further comprising a plurality of longitudinally spaced connecting rib members formed in each of said longitudinal bottom juncture portions.

24. The invention according to claim 23 in which each of said connecting rib members is a continuation of a longitudinal side rib member in said side liner wall adjacent to said bottom juncture portion.

25. The invention according to claim 18 further comprising a front liner wall having opposite end portions and top and bottom portions and adapted to cover the front wall of the truck bed, a transverse juncture portion integrally interconnecting the front end portion of said bottom liner wall and the bottom portion of said front liner wall, a pair of opposed vertical interconnecting corner portions, each corner portion interconnecting an end portion of said front liner wall and a front portion of a corresponding side liner wall, respectively.

26. The invention according to claim 25 in which said front rib members are transversely spaced vertical front rib members, and further comprising a plurality of vertically spaced transverse front rib members extending between said vertical front rib members.

27. The invention according to claim 25 further comprising a plurality of vertically spaced corner rib members in said vertical interconnecting corner portions.

28. The invention according to claim 27 in which said corner rib members are continuous extensions of said side rib members in said corresponding side liner walls to which said vertical corner portions are interconnected.

29. A protective tailgate liner for a substantially rectangular tailgate on a truck bed, said tailgate having an interior surface, top and bottom edge portions and substantially parallel end edge portions, comprising:
   (a) a tailgate liner body adapted to cover the interior surface of the tailgate and having top and bottom edge portions and opposite end portions,
   (b) a plurality of transversely spaced elongated rib members in said liner body,
   (c) a top hook member formed along the top edge portion of said tailgate liner body for engaging the top edge portion of a tailgate,
   (d) a bottom flange formed on the bottom portion of said tailgate body for engaging the bottom edge portion of a tailgate,
   (e) an end flange projecting rearwardly from the opposite end portion of said tailgate liner body and adapted to engage the corresponding end edge portions of the tailgate to prevent transverse displacement of said tailgate liner relative to the tailgate.

30. The invention according to claim 29 in which said rib members extend front-to-rear and each of said rib members comprises a plurality of longitudinally spaced depressions to minimize the sliding movement of loads over said tailgate liner body when disposed horizontally.

31. The invention according to claim 30 in which each of said depressions comprises converging intersecting front and rear walls, said rear wall being substantially steeper than said front wall to prevent slidable rearward movement of a load over the interior surface of said tailgate liner body.

* * * * *